G. A. BAKKE.
DRIVING PULLEY.
APPLICATION FILED JAN. 30, 1912.
1,040,993.
Patented Oct. 15, 1912.
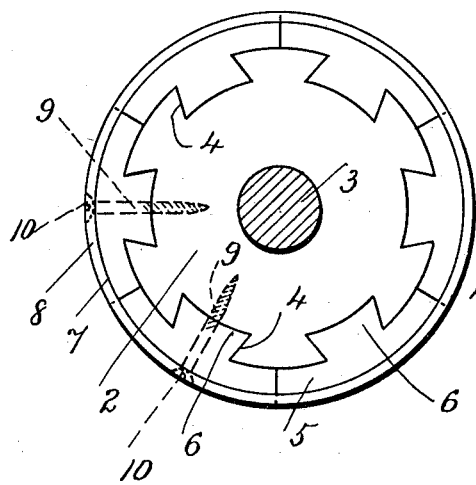
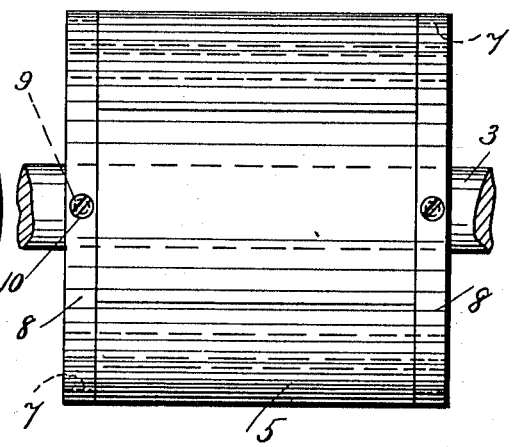
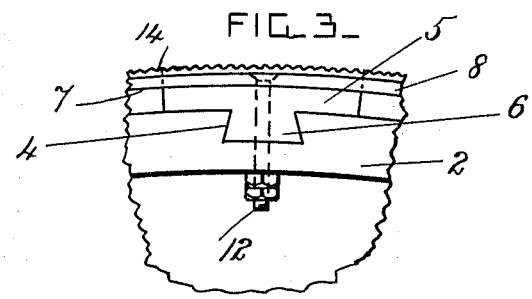
Witnesses
S. H. Davis.
W. L. Burch
Inventor
George A. Bakke.
By Herbert W. Jenner.
Attorney

UNITED STATES PATENT OFFICE.

GEORGE A. BAKKE, OF STANLEY, NORTH DAKOTA.

DRIVING-PULLEY.

1,040,993.

Specification of Letters Patent.

Patented Oct. 15, 1912.

Application filed January 30, 1912. Serial No. 674,393.

*To all whom it may concern:*

Be it known that I, GEORGE A. BAKKE, a citizen of the United States, residing at Stanley, in the county of Mountrail and State of North Dakota, have invented certain new and useful Improvements in Driving-Pulleys; and I do hereby declare the following to be a full, clear, and exact description of the invention, such as will enable others skilled in the art to which it appertains to make and use the same.

This invention relates to pulleys for driving belts used for driving all kinds of machinery; and it consists in providing the pulley with a renewable wooden lagging, as hereinafter fully described and claimed.

In the drawings, Figure 1 is an end view of a small pulley provided with a wooden lagging according to this invention. Fig. 2 is a side view of the pulley. Fig. 3 is an end view of a portion of the rim of a larger pulley, showing a modification.

The pulley is provided with a main portion or body portion 2 which is adapted to be mounted on a driving shaft 3. This body portion has a series of dovetailed grooves 4 formed longitudinally in its periphery. The lagging is formed of strips or bars 5 of wood provided with dovetailed tongues 6 on one side which are slidable in the grooves 4 of the metal body portion. The bars 5 are arranged around the body portion, and are curved to fit against its periphery.

The series of bars has a circumferential recess 7 at each end, and a metallic clamping ring 8 is arranged in each recess. The middle parts of the bars between the clamping rings form the driving part of the pulley, and the pulley may be flat or crowned as preferred. Screws 9 having countersunk heads 10 are screwed into the body portion, and secure the rings and the lagging to the body portion.

In Fig. 3 bolts 12 are used in place of the screws 9 to hold the lagging and the rings in place, and the surface of the lagging is provided with longitudinal serrations or corrugations 14 to prevent the driving belt from slipping.

What I claim is:

In a driving pulley, the combination, with a cylindrical body portion adapted to be mounted on a driving shaft and provided with a series of longitudinal dovetailed grooves arranged around its periphery, of a removable lagging formed of a series of curved lagging bars arranged side by side upon the cylindrical body portion and provided with longitudinal dovetailed tongues which are slidable in the said grooves, said bars having also notches at their extreme ends which form circumferential recesses, removable rings slidable in the said recesses, and removable fastening pins engaging with holes in the rings, bars and body portion and holding the rings and lagging bars in place.

In testimony whereof I have affixed my signature in the presence of two witnesses.

GEORGE A. BAKKE.

Witnesses:
 A. J. Ross,
 H. SPRINGAN.

Copies of this patent may be obtained for five cents each, by addressing the "Commissioner of Patents, Washington, D. C."